(12) United States Patent
Sugimoto

(10) Patent No.: US 12,398,943 B2
(45) Date of Patent: Aug. 26, 2025

(54) TEMPERATURE CONTROL STRUCTURE AND TEMPERATURE CONTROL METHOD FOR TRANSPORT CONTAINER

(71) Applicant: KOBE STEEL, LTD., Hyogo (JP)

(72) Inventor: Akio Sugimoto, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 136 days.

(21) Appl. No.: 18/564,447

(22) PCT Filed: Apr. 20, 2022

(86) PCT No.: PCT/JP2022/018316
§ 371 (c)(1),
(2) Date: Nov. 27, 2023

(87) PCT Pub. No.: WO2022/254987
PCT Pub. Date: Dec. 8, 2022

(65) Prior Publication Data
US 2024/0255208 A1   Aug. 1, 2024

(30) Foreign Application Priority Data

Jun. 1, 2021  (JP) ................... 2021-092340
Mar. 8, 2022  (JP) ................... 2022-035577

(51) Int. Cl.
*F25D 19/00*  (2006.01)

(52) U.S. Cl.
CPC ......... *F25D 19/003* (2013.01); *F25D 19/006* (2013.01)

(58) Field of Classification Search
CPC .... F25D 19/003; F25D 19/006; F25D 11/003; B60H 1/00014; B62D 33/048

USPC ........................................................ 165/80.5
See application file for complete search history.

(56) References Cited

U.S. PATENT DOCUMENTS

2004/0112079 A1   6/2004   Omuta et al.

FOREIGN PATENT DOCUMENTS

| CN | 1505471 A | 6/2004 |
| EP | 3540338 A1 | 9/2019 |
| JP | H02-141324 A | 5/1990 |
| JP | H04-128233 U | 11/1992 |
| JP | H05-187762 A | 7/1993 |
| JP | 2001-225892 A | 8/2001 |

(Continued)

OTHER PUBLICATIONS

International Preliminary Report on Patentability (Chapter I) and Written Opinion of the International Searching Authority issued in PCT/JP2022/018316; Notification mailed Dec. 14, 2023.

(Continued)

*Primary Examiner* — Steve S Tanenbaum
(74) *Attorney, Agent, or Firm* — Studebaker Brackett PLLC

(57) ABSTRACT

A temperature control structure for a transport container includes: a temperature control compartment provided in a truck; a transport container that is loaded into the temperature control compartment, and has a box shape capable of accommodating an object, in which at least a part of a wall constituting the box shape is a heat conduction portion made of metal; and a heat exchanger of a solid-state heat transfer type that is disposed in contact with the heat conduction portion and controls a temperature of the object via the heat conduction portion.

19 Claims, 12 Drawing Sheets

(56) References Cited

FOREIGN PATENT DOCUMENTS

| | | | |
|---|---|---|---|
| JP | 2002-332084 A | | 11/2002 |
| JP | 2004012059 A | * | 1/2004 |
| JP | 2005-061698 A | | 3/2005 |
| JP | 2018-096632 A | | 6/2018 |
| KR | 10-1836483 B1 | | 3/2018 |
| WO | WO-2015025675 A1 | * | 2/2015 ............ F28D 20/02 |
| WO | 2019/225237 A1 | | 11/2019 |

OTHER PUBLICATIONS

The extended European search report issued by the European Patent Office on Aug. 1, 2024, which corresponds to European Patent Application No. 22815743.4-1009 and is related to U.S. Appl. No. 18/564,447.

International Search Report issued in PCT/JP2022/018316; mailed May 31, 2022.

* cited by examiner

TEMPERATURE CONTROL STRUCTURE AND TEMPERATURE CONTROL METHOD FOR TRANSPORT CONTAINER

CROSS-REFERENCE TO RELATED APPLICATIONS

This is a national phase application in the United States of International Patent Application No. PCT/JP2022/018316 with an international filing date of Apr. 20, 2022, which claims priority of Japanese Patent Application No. 2021-092340 filed on Jun. 1, 2021 and Japanese Patent Application No. 2022-035577 filed on Mar. 8, 2022, the contents of which are incorporated herein by reference.

TECHNICAL FIELD

The present invention relates to a temperature control structure and a temperature control method for a transport container.

BACKGROUND ART

A temperature control transport vehicle that transports an object while controlling temperature is known. Generally, in the temperature control transport vehicle, an object is accommodated in a transport container made of resin, and the transport container is loaded and transported in a temperature control compartment provided in a luggage compartment of such as a truck. The inside of the temperature control compartment is temperature-controlled by an air conditioner, and the object is temperature-controlled.

For example, JP 2004-12059 A discloses a freezing and refrigerating chamber temperature control vehicle as an example of a temperature control transport vehicle. In the freezing and refrigerating chamber temperature control vehicle of JP 2004-12059 A, temperature management is performed in two chambers of freezing and refrigeration by using only one cold storage plate.

SUMMARY OF THE INVENTION

In the freezing and refrigerating chamber temperature control vehicle of JP 2004-12059 A, a cooling structure of a convection heat transfer type that controls an air temperature in a cooling compartment to a low temperature is adopted. Therefore, it is necessary to manage the entire room in the cooling compartment at a low temperature regardless of the size and number of the transport containers. Therefore, there is room for improvement in cooling efficiency.

An object of the present invention is to improve temperature control efficiency as compared with temperature control of a convection heat transfer type in a temperature control structure and a temperature control method for a transport container.

A first aspect of the present invention provides a temperature control structure for a transport container, the temperature control structure including: a temperature control compartment provided in a transport machine; a transport container that is loaded into the temperature control compartment, and has a box shape capable of accommodating an object, in which at least a part of a wall constituting the box shape is a heat conduction portion made of metal; and a heat exchanger of a solid-state heat transfer type that is disposed in contact with the heat conduction portion and controls a temperature of the object via the heat conduction portion.

According to this configuration, the temperature control structure of a solid-state heat transfer type that directly controls the temperature of the transport container by the heat exchanger is adopted. Therefore, in the heat exchanger, the refrigerant at the required temperature and the transport container exchange heat via the heat conduction portion, and the temperature of the transport container can be controlled. In the temperature control structure of a solid-state heat transfer type, since necessary temperature control can be realized according to the size and the number of the transport containers, the temperature control efficiency can be improved as compared with the temperature control of the convection heat transfer type. In addition, in the transport container, the heat conduction portion made of metal is provided at a contact portion with the heat exchanger. Therefore, it is possible to exhibit high heat exchange efficiency as compared with a material having a low thermal conductivity such as a resin. Note that, in the transport container, the entirety including the other portion of the heat conduction portion may be made of metal.

When the plurality of transport containers are controlled to different temperatures by the convection heat transfer method, it is necessary to partition the temperature control compartment with a partition wall because the temperature of the air needs to be changed for each required temperature. However, in the case of controlling the plurality of transport containers to different temperatures in a solid-state heat transfer manner, it is also possible to control the plurality of transport containers to respective required temperatures by arranging a plurality of heat exchangers using refrigerants having different temperatures in one room without partitioning the inside of the temperature control compartment by the partition wall. Since convection heat is also transferred to the surrounding air on the surface of the transport container, the temperature control compartment may be partitioned into a plurality of rooms by the partition wall as a means for further increasing the temperature control efficiency, and a plurality of heat exchangers using refrigerants having different temperatures may be arranged for the plurality of rooms, respectively.

According to these configurations, the temperature of the object can be controlled according to various required temperatures. Accordingly, the objects having different required temperatures can be transported at a time. For example, the temperature control compartment may be divided into a plurality of rooms corresponding to required temperatures of freezing, refrigeration, normal temperature, and high temperature.

The transport container may have a plurality of protruding portions having a heat insulating property on a first surface that is an outer surface.

According to this configuration, when the transport container comes into contact with an arbitrary surface having no temperature control function, it is possible to suppress the heat entering/exiting from the surface to the transport container. For example, even when the transport container is placed on an arbitrary floor surface having no temperature control function, the temperature of the transport container (that is, the temperature of the object) can be maintained at the required temperature.

The transport container may have a plurality of recessed portions having shapes complementary to the protruding portions on a second surface that is an outer surface facing the first surface.

According to this configuration, the transport containers can be arranged by combining the recessed portions and the protruding portions, and the states of the transport containers can be stabilized. For example, the transport containers can be stacked so as to stabilize the states.

A plurality of the transport containers may be loaded in contact with each other in the temperature control compartment, and at least a part of a portion where the transport containers are in contact with each other may be the heat conduction portion.

According to this configuration, since the thermal energy from the heat exchanger is also transferred between the plurality of transport containers, efficient temperature control can be realized.

The heat conduction portion may be made of an aluminum alloy.

According to this configuration, since the aluminum alloy has a higher thermal conductivity and a lower radiation factor than other common metals, efficient temperature control can be realized.

The temperature control structure for a transport container may further include a cold storage material or a heat storage material that controls a temperature of the transport container.

According to this configuration, the temperature of the transport container can be further controlled by the cold storage material or the heat storage material.

A second aspect of the present invention provides a temperature control method for a transport container, the temperature control method including: preparing a temperature control compartment provided in a transport machine, a transport container that is loaded into the temperature control compartment, and has a box shape capable of accommodating an object, in which at least a part of a wall constituting the box shape is a heat conduction portion made of metal, and a heat exchanger that controls a temperature of the object; and bringing the heat exchanger and the heat conduction portion into contact with each other, and controlling the temperature of the object by the heat exchanger in a solid-state heat transfer manner via the heat conduction portion.

According to this method, the temperature control method of a solid-state heat transfer type that directly controls the temperature of the transport container by the heat exchanger is adopted. Therefore, in the heat exchanger, the refrigerant at the required temperature and the transport container exchange heat via the heat conduction portion, and the temperature of the transport container can be controlled. In the temperature control method of a solid-state heat transfer type, since necessary temperature control can be realized according to the size and the number of the transport containers, the temperature control efficiency can be improved as compared with the temperature control of the convection heat transfer type. In addition, in the transport container, the heat conduction portion made of metal is provided at a contact portion with the heat exchanger. Therefore, it is possible to exhibit high heat exchange efficiency as compared with a material having a low thermal conductivity such as a resin. Note that, in the transport container, the entirety including the other portion of the heat conduction portion may be made of metal.

According to the present invention, since the temperature control structure of a solid-state heat transfer type is adopted, it is possible to provide the temperature control structure and the temperature control method for a transport container with improved temperature control efficiency as compared with the temperature control of the convection heat transfer type.

DETAILED DESCRIPTION

Hereinafter, as embodiments of the present invention, a temperature control structure for a transport container for transporting an object while controlling the temperature will be described with reference to the accompanying drawings. As the temperature control structure, a cooling structure is exemplified in the first embodiment, and a heating structure is exemplified in the second embodiment. In the following description, terms indicating directions, such as up or down, may be used, which shall refer to directions in a state where the transport container is loaded onto a transport machine.

First Embodiment

Figure 1:
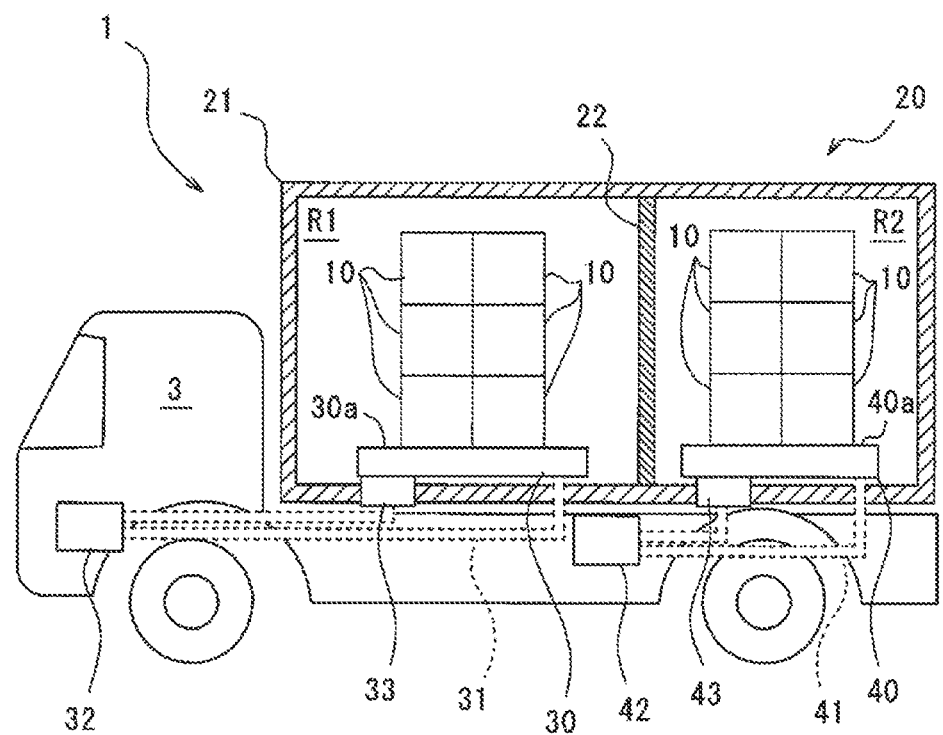
FIG. 1 is a schematic configuration diagram of a truck in which a temperature control structure for a transport container according to a first embodiment of the present invention is adopted.

FIG. 1 shows a schematic configuration diagram of a truck 1 in which a temperature control structure for a transport container 10 according to the first embodiment is adopted. For example, the truck 1 transports an object (cooling object in the present embodiment) such as a frozen food, a lunch box, a rice ball, or a sandwich at a low temperature from a low-temperature warehouse such as a frozen center or a chilled center located in each place to a destination such as a convenience store all over the country.

The truck 1 is an example of a transport machine, and the temperature control structure of the present disclosure can be applied to any transport machine such as other vehicles or ships. In addition, the object is not particularly limited, and any object requiring temperature control other than those described above is targeted, and the transport source and the transport destination may be various.

Referring to FIG. 1, a temperature control compartment 20 is disposed in the truck 1. The temperature control compartment 20 is located behind a driver's cab 3 of the truck 1. The temperature control compartment 20 includes a box-shaped outer wall 21 and a partition wall 22 disposed inside the box-shaped outer wall 21. The inside of the temperature control compartment 20 is partitioned into a plurality of rooms (two rooms R1 and R2 in the present embodiment) by the partition wall 22. Preferably, the outer wall 21 and the partition wall 22 have thermal insulation performance in order to increase temperature control efficiency.

In the present embodiment, for each required temperature of the object, one room R1 is provided for freezing, and the other room R2 is provided for refrigeration. For example, the required temperature of the object may be about −20° C. in a room R1 for freezing, and about 5° C. in a room R2 for refrigerating. Although not illustrated in detail, a room for room temperature may be further provided by adding a partition wall 22. For example, in the room for normal temperature, the required temperature of the object may be about 20° C. When it is not necessary to transport the object for each temperature or when the temperature difference between a plurality of objects having different required temperatures is not large, the entire inside of the temperature control compartment 20 may be provided as one room without providing the partition wall 22.

A plurality of transport containers 10 are loaded into the temperature control compartment 20. In the temperature control compartment 20, the plurality of transport containers 10 are loaded in contact with each other in the horizontal direction and the vertical direction. Details of the transport container 10 will be described later.

The temperature control structure of the present disclosure is of a solid-state heat transfer type using heat exchangers 30 and 40. That is, the heat exchangers 30 and 40 are in contact with at least a part of the transport container 10, and the heat exchangers 30 and 40 directly control the temperature of the transport container 10 (cool the transport container 10 in the present embodiment).

In the present embodiment, the heat exchangers 30 and 40 are of a plate type, for example, and are provided for the plurality of rooms R1 and R2, respectively. The heat exchangers 30 and 40 are disposed to be exposed to an inner lower surface of the temperature control compartment 20. The heat exchangers 30 and 40 are fluidly connected to compressors 32 and 42 and capacitors 33 and 43, respectively, via pipes 31 and 41 (schematically indicated by broken lines). Refrigerant flows in the pipes 31 and 41. The refrigerant is compressed by the compressors 32 and 42, liquefied by the capacitors 33 and 43, and evaporated by the heat exchangers 30 and 40. That is, the heat exchangers 30 and 40 function as evaporators. In this manner, the refrigerant circulates between the heat exchangers 30 and 40, the compressors 32 and 42, and the capacitors 33 and 43 via the pipes 31 and 41, respectively. That is, a general refrigeration cycle is configured.

The heat exchangers 30 and 40 have temperature control surfaces 30a and 40a having temperature control functions, respectively. The temperature control surfaces 30a and 40a are disposed so as to be exposed to the inner lower surface of the temperature control compartment 20. Therefore, the user can control the temperatures of the transport containers 10 (cool the transport containers 10 in the present embodiment) by placing the transport containers 10 on the temperature control surfaces 30a and 40a. Alternatively, the temperature control surfaces 30a and 40a of the heat exchangers 30 and 40 may be disposed on an inner side surface, an inner upper surface, or the like of the temperature control compartment 20.

Figure 2:
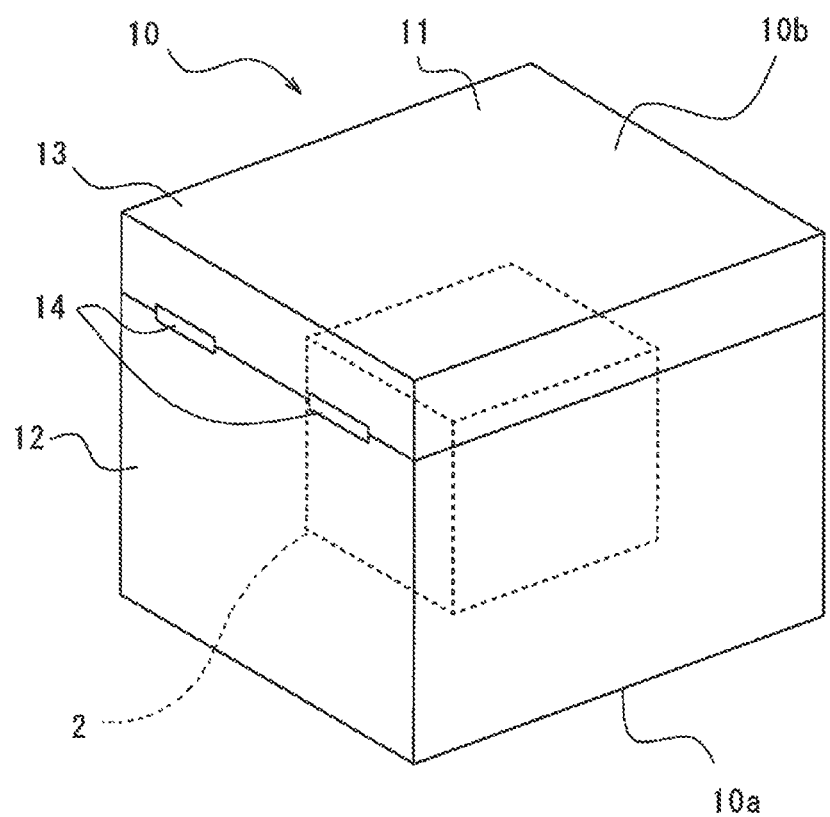
FIG. 2 is a perspective view of the transport container.
Figure 2:
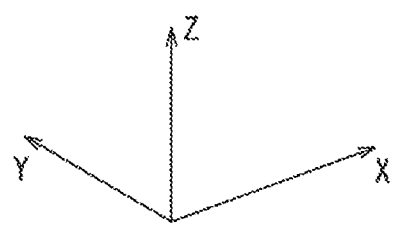

FIG. 2 shows a perspective view of the transport container 10. In FIG. 2, the front of the truck 1 is indicated by an X direction, the side is indicated by a Y direction, and the upper side is indicated by a Z direction. The same applies to the following drawings.

The transport container 10 has a box shape capable of accommodating an object 2 (schematically indicated by a broken line). For example, the outer shape of the transport container 10 is a rectangular parallelepiped shape. In the present embodiment, the transport container 10 is made of an aluminum alloy. Therefore, the entire outer wall of the transport container 10 is a heat conduction portion 11 having a higher thermal conductivity than the resin. The heat conduction portion 11 of the transport container 10 is disposed on the temperature control surfaces 30a and 40a (see FIG. 1) of the heat exchangers 30 and 40, and is directly temperature-controlled from the temperature control surfaces 30a and 40a of the heat exchangers 30 and 40. In particular, silicon grease or the like having a high thermal conductivity may be applied to the heat conduction portion 11. In addition, in the present embodiment, since the entire outer wall of the transport container 10 is the heat conduction portion 11, it is possible to dispose the transport container 10 on the temperature control surfaces 30a and 40a with an arbitrary surface of the transport container 10 facing downward. Alternatively, not the entire transport container 10 but a part thereof may be used as the heat conduction portion 11, and the heat conduction portion 11 may be disposed on the temperature control surfaces 30a and 40a (see FIG. 1) of the heat exchangers 30 and 40. In addition, the material of the heat conduction portion 11 is not limited to the aluminum alloy, and may be other metals.

In addition, the opening and closing structure of the transport container 10 for accommodating the object 2 is not particularly limited, and may be any structure. For example, as illustrated in FIG. 2, the transport container 10 may have a main body 12 that accommodates the object 2 and a lid body 13 that closes the main body 12. In addition, the lid body 13 may be pivotally supported by a hinge 14 with respect to the main body 12. In addition, the hinge 14 and the lid body 13 can be configured at arbitrary positions and shapes. For example, as illustrated in FIG. 2, a structure in which the upper side of the transport container 10 is opened may be used, or alternatively, a structure in which the side is opened and closed may be used. Further, a structure in which the lid body 13 is detachable from the main body 12 without the hinge 14 may be used.

According to the present embodiment, the following operational effects are obtained.

A temperature control structure of a solid-state heat transfer type is adopted in which the temperature of the transport container 10 is directly controlled (cooled in the present embodiment) by the heat exchangers 30 and 40. Therefore, in the heat exchangers 30 and 40, the low-temperature refrigerant and the transport container 10 exchange heat via the heat conduction portion, and the temperature of the transport container 10 can be controlled. In the temperature control structure of a solid-state heat transfer type, since necessary temperature control can be realized according to the size and the number of the transport containers 10, the temperature control efficiency can be improved as compared with the temperature control of the convection heat transfer type. In addition, in the transport container 10, the heat conduction portion 11 made of metal is provided at a contact portion with the heat exchangers 30 and 40. Specifically, in the present embodiment, the entire transport container 10 is the heat conduction portion 11 made of metal. Therefore, it is possible to exhibit high heat exchange efficiency as compared with a material having a low thermal conductivity such as a resin.

As described above, the inside of the temperature control compartment 20 is partitioned into the two rooms R1 and R2 by the partition wall 22. The heat exchangers 30 and 40 using refrigerants having different temperatures are disposed in the two rooms R1 and R2, respectively. Therefore, the temperature of the object 2 can be controlled according to the required temperature. Accordingly, the objects 2 having different required temperatures can be transported at a time.

In addition, the plurality of transport containers 10 are loaded in contact with each other in the up-down direction and the left-right direction in the temperature control compartment 20. In the present embodiment, since the entire outer wall of the transport container 10 is the heat conduction portion 11 made of an aluminum alloy, the cold energy obtained by the transport container 10 arranged at the lowermost stage from the heat exchangers 30 and 40 is efficiently transmitted to the other transport containers 10. Therefore, it is possible to realize efficient temperature control of the solid-state heat transfer type among the plurality of transport containers 10. Alternatively, at least a part of a portion where the transport containers 10 are in contact with each other may be used as the heat conduction portion 11 instead of the entire outer wall of the transport container 10.

The transport container 10 is made of an aluminum alloy. Since the aluminum alloy has a higher thermal conductivity and a lower radiation factor than other common metals, efficient temperature control can be realized.

(First Modification)

Figure 3:
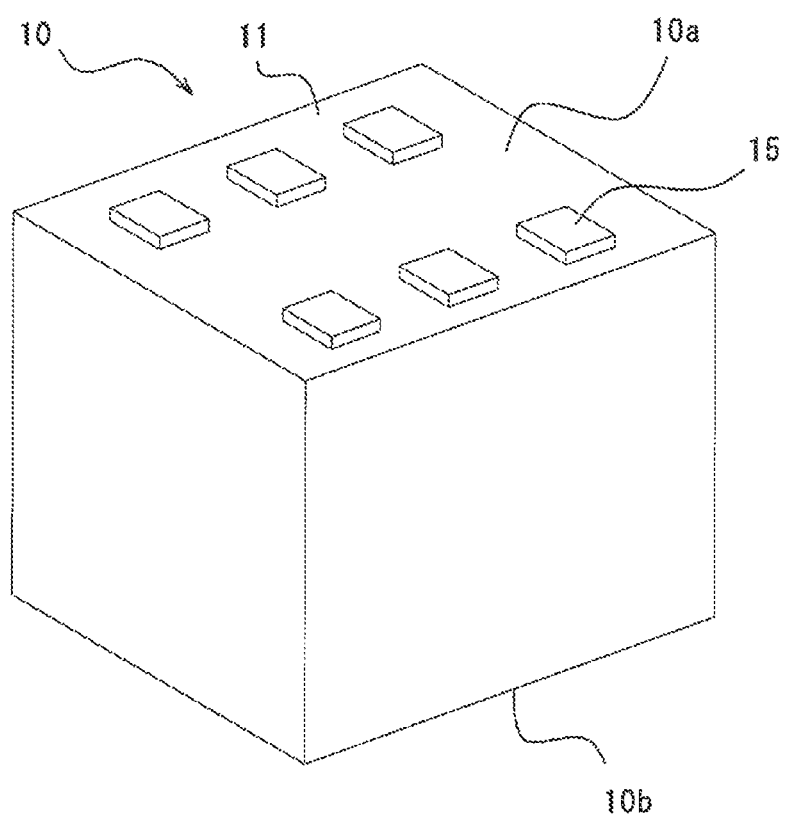
FIG. 3 is a lower perspective view of a transport container in a first modification.
Figure 3:
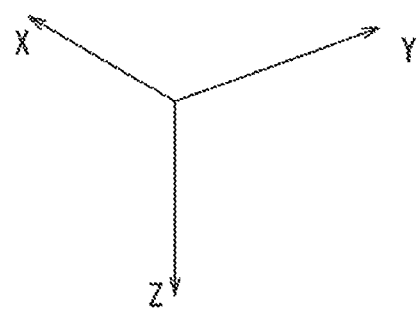

FIG. 3 shows a lower perspective view of a transport container 10 in a first modification. In FIG. 3, illustration of the opening/closing structure of the transport container 10 is omitted. In addition, in FIG. 4 and subsequent drawings, illustration of the opening/closing structure of the transport container 10 is similarly omitted.

The transport container 10 in the present modification has a plurality of protruding portions 15 having a heat insulating property on a lower surface 10a (illustrated as an upper surface in FIG. 3). Here, the lower surface 10a is an example of a first surface of the present invention. The number of the plurality of protruding portions 15 is six in the present modification, and one of them is denoted by a reference sign. The plurality of protruding portions 15 are made of resin. The resin is preferable as the material of the plurality of protruding portions 15 because it has a lower thermal conductivity than metal and a heat insulating property. More preferably, the plurality of protruding portions 15 are made of foamed resin having higher heat insulating properties. The plurality of protruding portions 15 are bonded to the lower surface 10a of the transport container 10 with an adhesive. In the example of FIG. 3, each of the plurality of protruding portions 15 has a rectangular parallelepiped shape, but the shape is not particularly limited. Further, the plurality of protruding portions 15 may be provided on the side surface of the transport container 10.

According to the present modification, when the transport container 10 is placed on an arbitrary floor surface having no temperature control function, heat transfer between the floor surface and the transport container 10 can be suppressed. In other words, even when the transport container 10 is placed on an arbitrary floor surface having no temperature control function, the temperature of the transport container 10 (that is, the temperature of the object 2) can be maintained at the required temperature.

(Second Modification)

Figure 4:
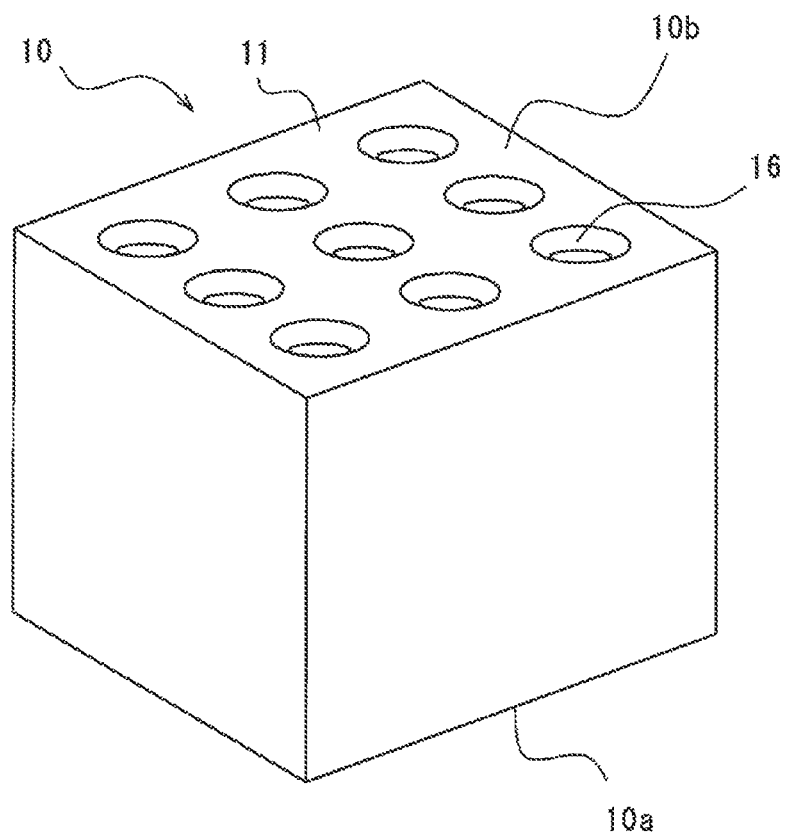
FIG. 4 is an upper perspective view of a transport container in a second modification.
Figure 5:
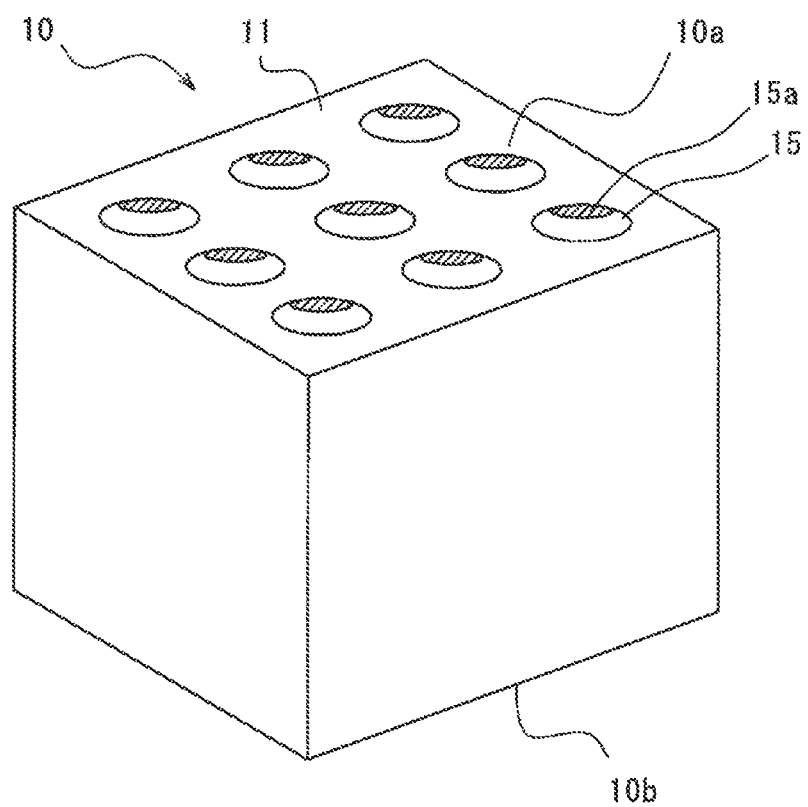
FIG. 5 is a lower perspective view of the transport container in the second modification.
Figure 5:
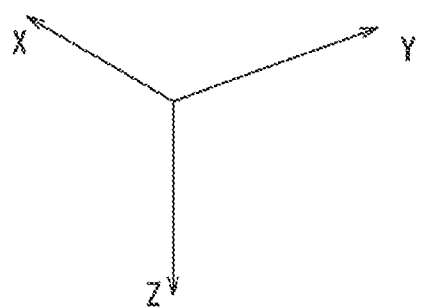

FIG. 4 shows a lower perspective view of a transport container 10 in a second modification. FIG. 5 shows an upper perspective view of the transport container 10 in the second modification.

As in the first modification, the transport container 10 in the present modification has a plurality of protruding portions 15 having a heat insulating property on a lower surface 10a (illustrated as an upper surface in FIG. 5). The number of the plurality of protruding portions 15 is nine in the present modification, and one of them is denoted by a reference sign (see FIG. 5). The plurality of protruding portions 15 are formed by molding the lower surface 10a into a protruding shape by press molding. Preferably, the plurality of protruding portions 15 are formed by bonding, for example, resin members 15a (see hatched portions) having a low thermal conductivity to the molded surface having a protruding shape. In the present modification, each of the plurality of protruding portions 15 has a truncated cone shape.

In addition, the transport container 10 in the present modification has a plurality of recessed portions 16 having shapes complementary to the plurality of protruding portions 15 on an upper surface 10b. Here, the upper surface 10b is an example of a second surface of the present invention. The number of the plurality of recessed portions 16 is nine in the present modification, and one of them is denoted by a reference sign (see FIG. 4). That is, each of the plurality of recessed portions 16 in the present modification is a recess having a truncated cone shape. In addition, the plurality of recessed portions 16 may be provided on a side surface facing a side surface on which the plurality of protruding portions 15 are provided in the transport container 10.

When the transport containers 10 are arranged in the up-down direction, the plurality of protruding portions 15 are arranged so as to be accommodated in the plurality of recessed portions 16. At this time, the upper surface 10b of one transport container 10 and the lower surface 10a of the other transport container 10 come into contact with each other, and thermal energy is exchanged between heat exchangers 30 and 40.

According to the present modification, the states of the transport containers 10 can be stabilized by stacking the transport containers 10 by combining the plurality of recessed portions 16 and the plurality of protruding portions 15.

(Third Modification)

Figure 6:
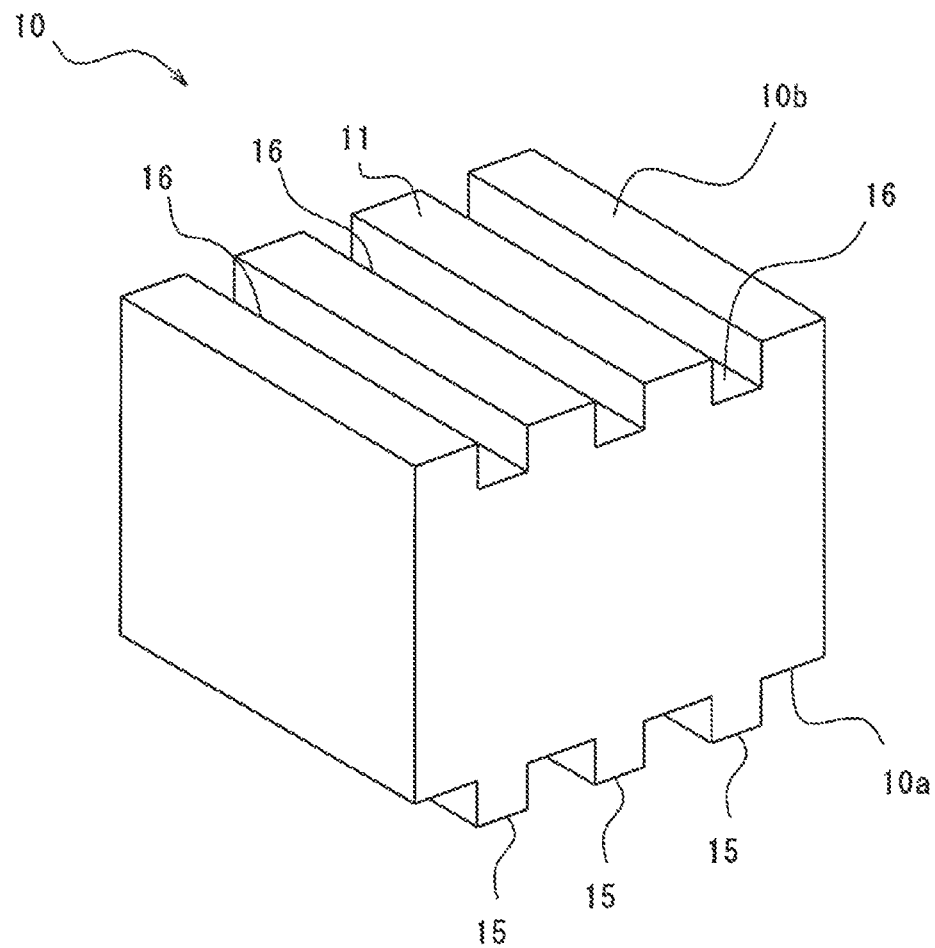
FIG. 6 is an upper perspective view of a transport container in a third modification.
Figure 6:
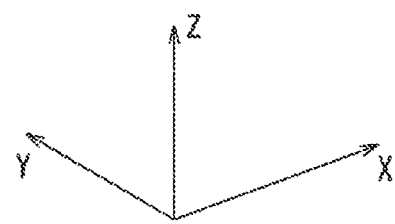

FIG. 6 shows an upper perspective view of a transport container 10 in a third modification.

Similarly to the first and second modifications, the transport container 10 in the present modification has a plurality of (three in the present modification) protruding portions 15 having a heat insulating property on a lower surface 10a. The plurality of protruding portions 15 are formed by molding the lower surface 10a into an elongated protruding shape (protrusion) by press molding. Preferably, the plurality of protruding portions 15 are formed by bonding resin members 15a (see hatched portions) having a low thermal conductivity to the molded protrusion surface.

In addition, the transport container 10 in the present modification has a plurality of (three in the present modification) recessed portions 16 having shapes complementary to the plurality of protruding portions 15 on an upper surface 10b. Each of the plurality of recessed portions 16 is formed in a groove shape on the upper surface 10b.

When the transport containers 10 are arranged in the up-down direction, the plurality of protruding portions 15 are arranged so as to be accommodated in the plurality of recessed portions 16. At this time, the plurality of protruding portions 15 are slidable in the plurality of recessed portions 16. Therefore, the operation of stacking the transport containers 10 can be facilitated.

(Fourth Modification)

Figure 7:
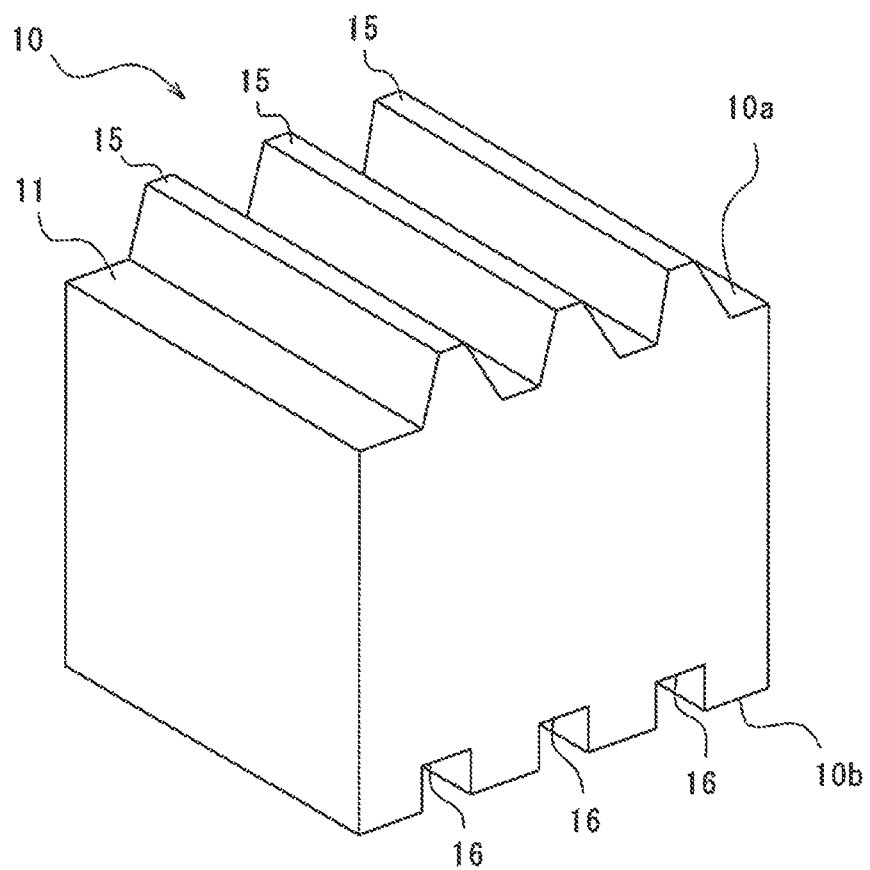
FIG. 7 is a lower perspective view of a transport container in a fourth modification.
Figure 7:
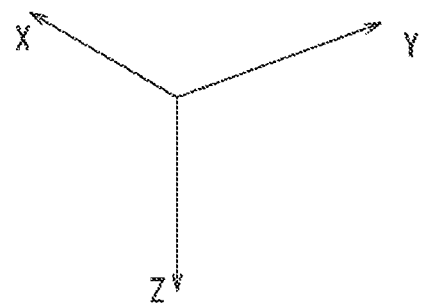

FIG. 7 shows a lower perspective view of a transport container 10 in a fourth modification.

The transport container 10 in the present modification has a shape in which the plurality of protruding portions 15 in the third modification are tapered downward (illustrated as upward in FIG. 7).

According to the present modification, the ground contact area of the plurality of protruding portions 15 can be reduced. Therefore, it is possible to reduce heat conduction with the floor surface when the transport container 10 is placed on an arbitrary floor surface having no temperature control performance.

Figure 8:
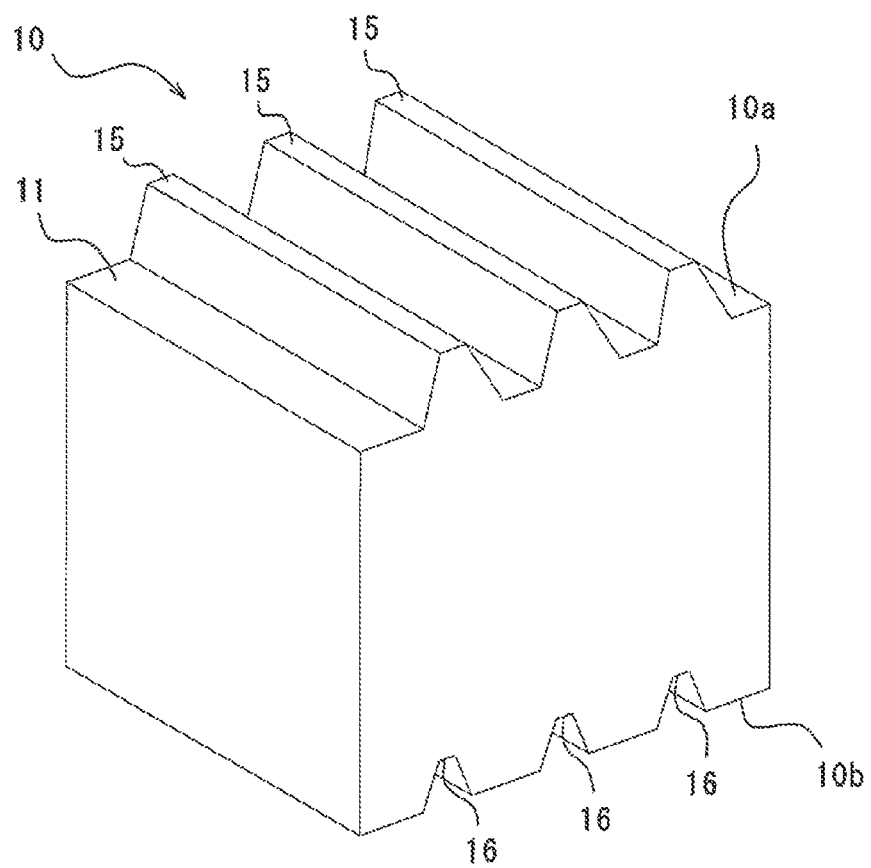
FIG. 8 is a lower perspective view of a transport container in a fifth modification.
Figure 8:
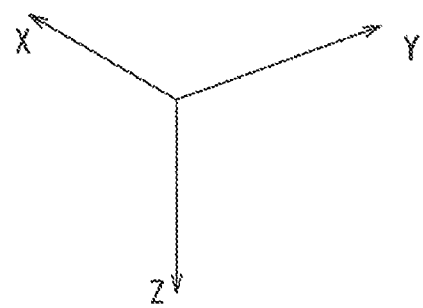

FIG. 8 shows a lower perspective view of a transport container 10 in a fifth modification.

Similarly to the fourth modification illustrated in FIG. 7, the transport container 10 in the present modification has a shape in which a plurality of protruding portions 15 are tapered downward (illustrated as upward in FIG. 8).

In addition, in the present modification, a plurality of recessed portions 16 of the transport container 10 have shapes complementary to the plurality of protruding portions 15. That is, the plurality of recessed portions 16 also have a shape tapered downward (illustrated as upward in FIG. 8).

According to the present modification, the contact area between the plurality of protruding portions 15 and the plurality of recessed portions 16 can be increased, and the heat conduction efficiency can be enhanced.

(Sixth Modification)

Figure 9:
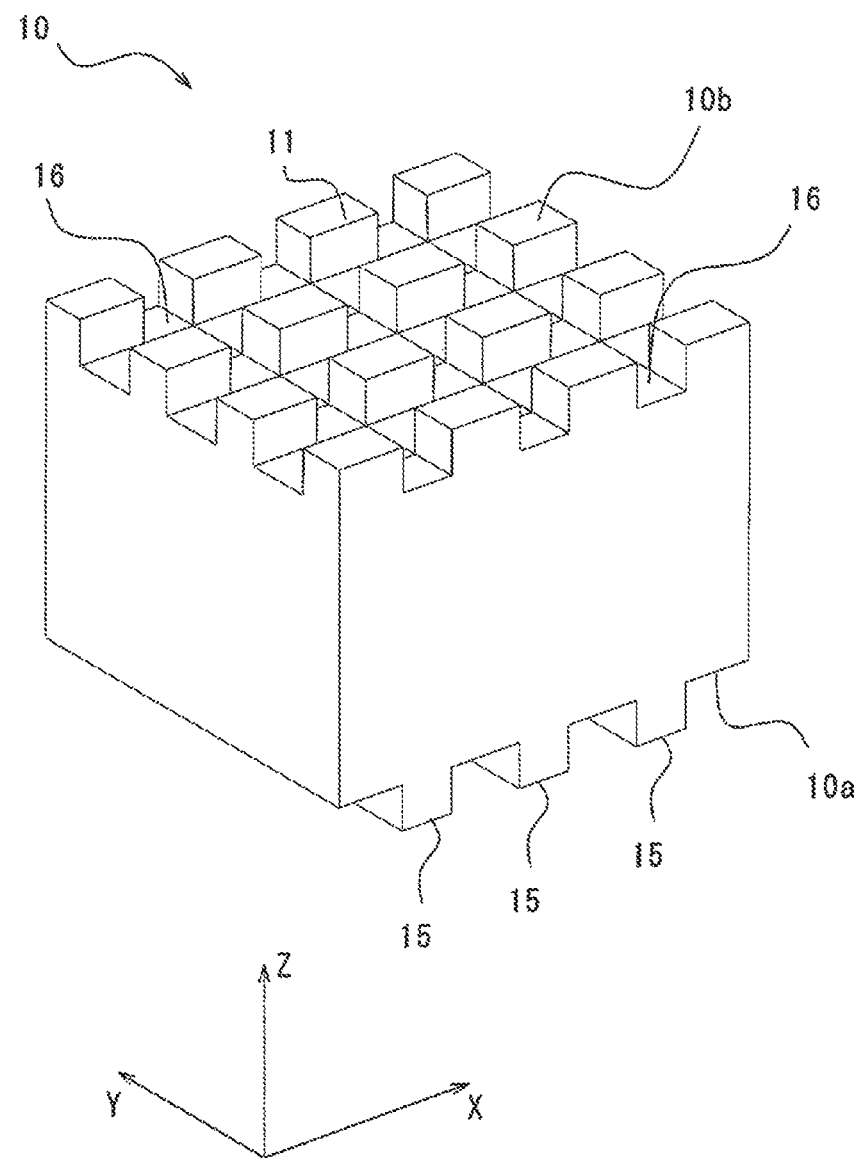
FIG. 9 is an upper perspective view of a transport container in a sixth modification.

FIG. 9 shows an upper perspective view of a transport container 10 in a sixth modification.

On a lower surface 10a of the transport container 10 in the present modification, a plurality of protruding portions 15 same as those in the third modification are formed. An upper surface 10b is provided with recessed portions 16 in a lattice pattern.

When the transport containers 10 are arranged in the up-down direction, the plurality of protruding portions 15 are arranged so as to be accommodated in the recessed portions 16 in a lattice pattern. At this time, the plurality of protruding portions 15 are slidable in the recessed portions 16 in a lattice pattern. Therefore, the operation of stacking the transport containers 10 can be facilitated.

Figure 10:
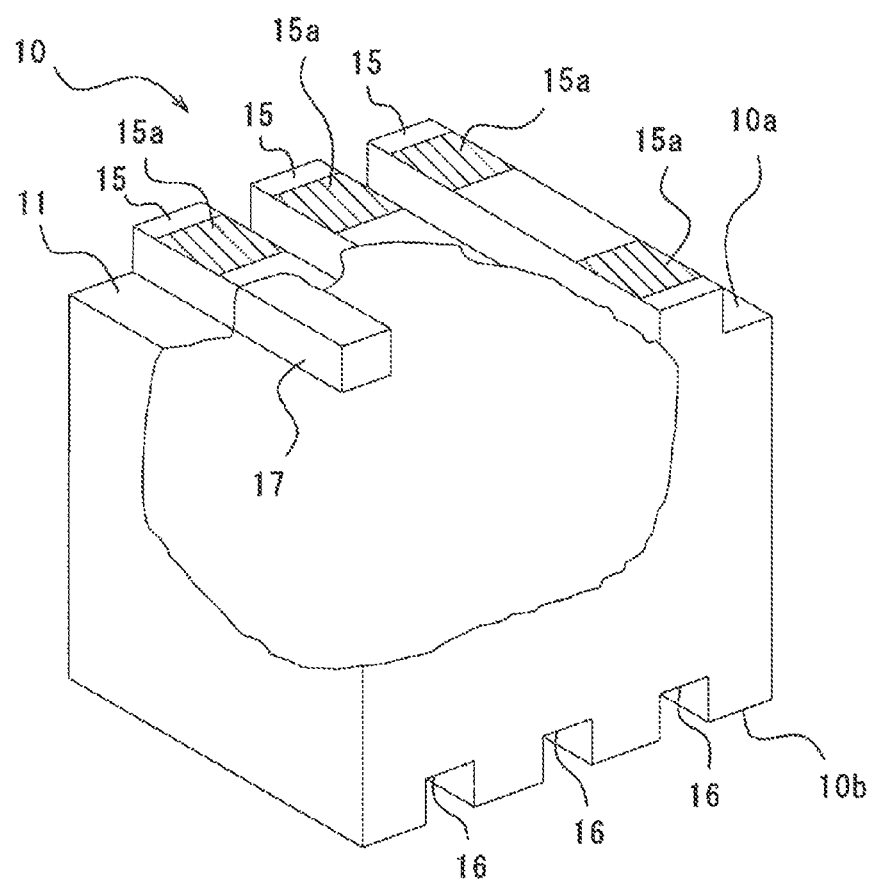
FIG. 10 is a broken perspective view of a transport container in a seventh modification.
Figure 10:
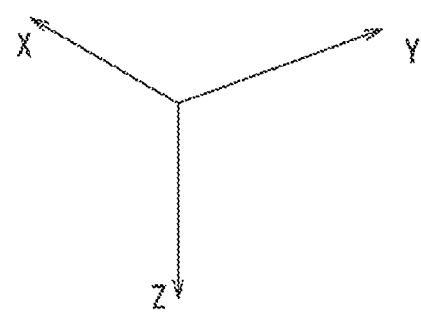

FIG. 10 shows a broken perspective view of a transport container 10 in a seventh modification.

On a lower surface 10a of the transport container 10 in the present modification, a plurality of protruding portions 15 same as those in the third modification are formed. A cold storage material 17 for temperature control is disposed inside each of the plurality of protruding portions 15. As the cold storage material 17, one having various temperature control performances can be used according to the required temperature. For example, a resin member 15a (see a hatched portion) having a low thermal conductivity is bonded to each of the surfaces of the plurality of protruding portions 15.

According to the present modification, the temperature of the transport container 10 can be further controlled by the cold storage materials 17. In particular, since the cold storage material 17 is disposed in each of the plurality of protruding portions 15 and the resin member 15a (see the shaded portion) is bonded to each of the surfaces of the plurality of protruding portions 15, it is possible to reduce the amount of heat input from the floor surface when the transport container 10 is placed on an arbitrary floor surface having no temperature control performance. The arrangement of the cold storage material 17 is not particularly limited in the plurality of protruding portions 15, and may be any position where the temperature of the transport container 10 can be controlled.

(Other Modification)

Figure 11:
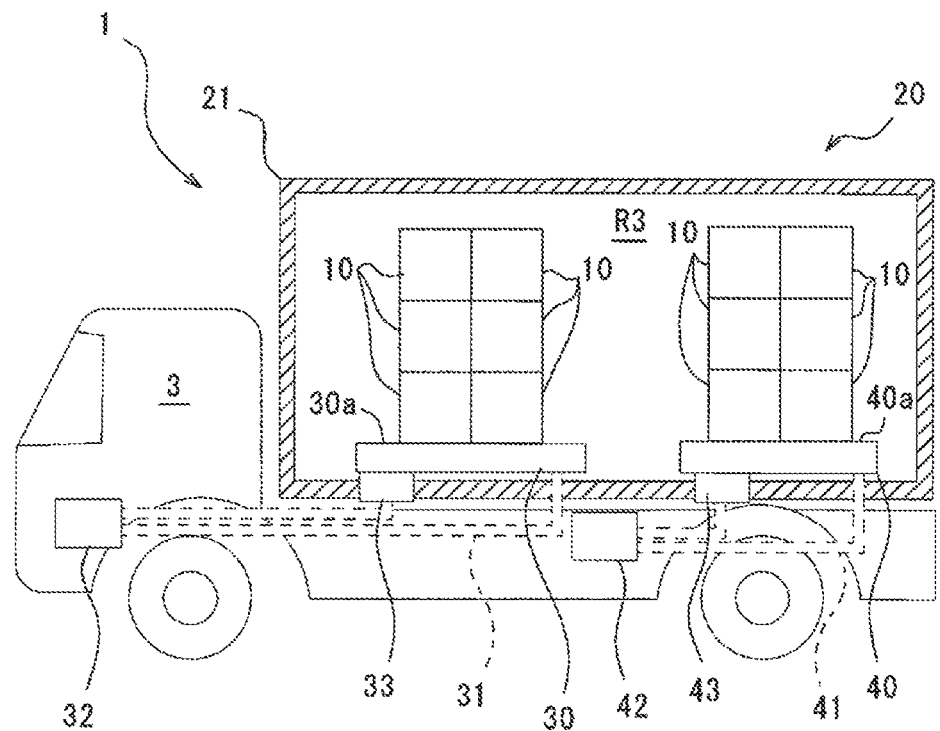
FIG. 11 is a schematic configuration diagram of a truck in which a temperature control structure for a transport container in another modification is adopted.
Figure 12:
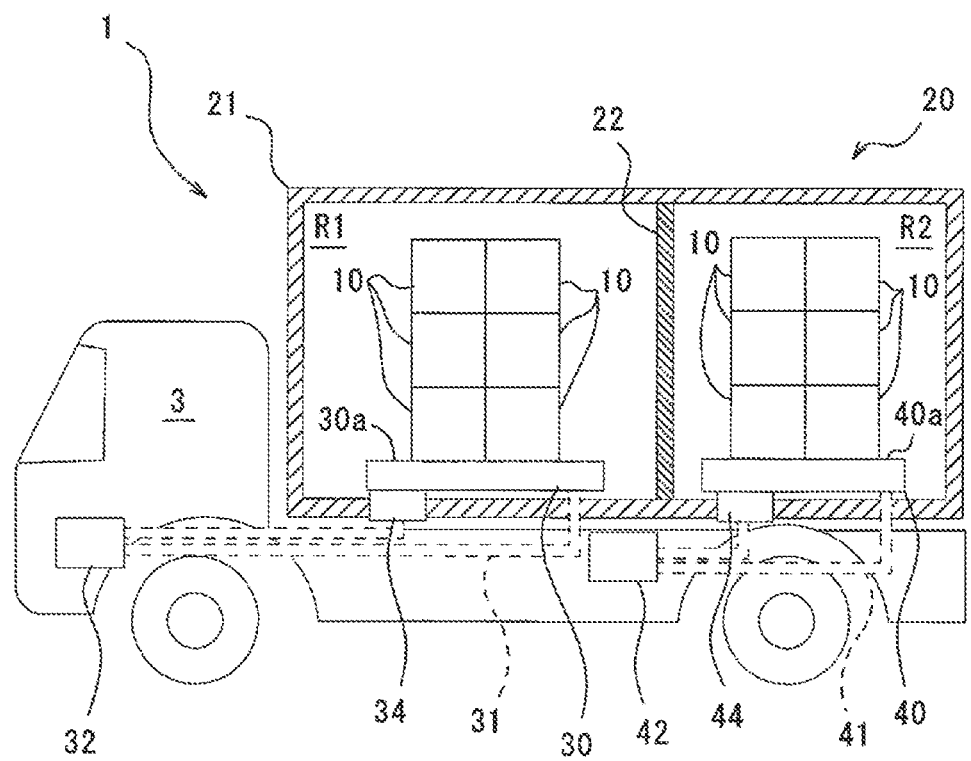
FIG. 12 is a schematic configuration diagram of a truck in which a temperature control structure for a transport container according to a second embodiment is adopted.

FIG. 11 shows a schematic configuration diagram of a truck 1 in which a temperature control structure for a transport container 10 in another modification is adopted.

In the present modification, the partition wall 22 (see FIG. 1) in the above embodiment is omitted. That is, the inside of a temperature control compartment 20 includes one room R3. In the one room R3, heat exchangers 30 and 40 using refrigerants having different temperatures are disposed.

According to the present modification, unlike the convection heat transfer type in which the temperature control compartment 20 needs to be partitioned by the partition wall in the case of transporting objects having different required temperatures, the temperature control structure of a solid-state heat transfer type is adopted, so that objects having different required temperatures can be transported at once without partitioning the temperature control compartment 20 into a plurality of rooms.

Second Embodiment

FIG. 11 shows a schematic configuration diagram of a truck 1 in which a temperature control structure for a transport container 10 according to the second embodiment is adopted. For example, the truck 1 transports an object (heating object in the present embodiment) 2 at a high temperature. The description of the same configuration as that of the first embodiment may be omitted.

Also in the present embodiment, the truck 1 is an example of a transport machine, and the temperature control structure of the present disclosure can be applied to any transport machine such as other vehicles or ships. In addition, the object 2 is not particularly limited, and any object requiring temperature control is targeted, and the transport source and the transport destination may be various.

In the present embodiment, for each required temperature of an object 2, one room R1 is provided for heating at a high temperature, and the other room R2 is provided for heating at a higher temperature than the one room. Although not illustrated in detail, a room for room temperature may be further provided by adding a partition wall 22. When it is not necessary to transport the object 2 for each temperature or when the temperature difference between a plurality of objects having different required temperatures is not large, the entire inside of a temperature control compartment 20 may be provided as one room without providing the partition wall 22.

A plurality of transport containers 10 are loaded into the temperature control compartment 20. In the temperature control compartment 20, the plurality of transport containers 10 are loaded in contact with each other in the horizontal direction and the vertical direction. The transport container 10 is the same as that of the first embodiment.

The temperature control structure of the present disclosure is of a solid-state heat transfer type using heat exchangers 30 and 40. That is, the heat exchangers 30 and 40 are in contact with at least a part of the transport container 10, and the heat exchangers 30 and 40 directly control the temperature of the transport container 10 (heat the transport container 10 in the present embodiment).

In the present embodiment, the heat exchangers 30 and 40 are of a plate type, for example, and are provided for the plurality of rooms R1 and R2, respectively. The heat exchangers 30 and 40 are disposed to be exposed to an inner lower surface of the temperature control compartment 20. The heat exchangers 30 and 40 are fluidly connected to compressors 32 and 42 and evaporators 34 and 44, respectively, via pipes 31 and 41 (schematically indicated by broken lines). Refrigerant flows in the pipes 31 and 41. The refrigerant is compressed by the compressors 32 and 42, is condensed by the heat exchangers 30 and 40, heats the object 2, and evaporates by the evaporators 34 and 44. That is, in the present embodiment, the heat exchangers 30 and 40 function as capacitors. In this manner, the refrigerant circulates between the compressors 32 and 42, the heat exchangers 30 and 40, and the evaporators 34 and 44 via the pipes 31 and 41, respectively.

The heat exchangers 30 and 40 have temperature control surfaces 30a and 40a having temperature control functions, respectively. The temperature control surfaces 30a and 40a are disposed so as to be exposed to the inner lower surface of the temperature control compartment 20. Therefore, the user can control the temperatures of the transport containers 10 (heat the transport containers 10 in the present embodiment) by placing the transport containers 10 on the temperature control surfaces 30a and 40a. Alternatively, the temperature control surfaces 30a and 40a of the heat exchangers 30 and 40 may be disposed on an inner side surface, an inner upper surface, or the like of the temperature control compartment 20.

The structure of the transport container 10 illustrated in FIGS. 2 to 10 is also applicable in the present embodiment. As a result, thermal energy is efficiently transferred among the plurality of transport containers 10. The cold storage material 17 for cooling in FIG. 10 is replaced with a heat storage material 17 for heating.

Although specific embodiments of the present invention and modifications thereof have been described above, the present invention is not limited to the above embodiments, and various modifications can be made within the scope of the present invention. For example, an appropriate combination of the contents of individual modifications may be an embodiment of the present invention. That is, a temperature control structure having both a cooling structure and a heating structure may be provided.

In the above embodiment, substantially the entire transport container 10 is made of an aluminum alloy, but at least a part of a contact portion with the heat exchangers 30 and 40 and a portion where the transport containers 10 are in contact with each other may be made of metal (for example, made of an aluminum alloy) as the heat conduction portion 11. In addition, the transport container 10 may have a heat insulating material, a cold storage material, or a heat storage material on the outer surface other than the heat conduction portion 11 from the viewpoint of maintaining the required temperature. In addition to the temperature control structure of a solid-state heat transfer type of the above embodiment, an air conditioner that controls the temperature in the temperature control compartment 20 in a convection heat transfer manner may be provided. That is, the temperature control structures of both the convection heat transfer type and the solid-state heat transfer type may be adopted.

1 truck
2 object
3 driver's cab
10 transport container
10a lower surface (first surface)
10b upper surface (second surface)
11 heat conduction portion
12 main body
13 lid body
14 hinge
15 protruding portion
15a resin member
16 recessed portion
17 cold storage material (heat storage material)
20 temperature control compartment
21 outer wall
22 partition wall
30 heat exchanger
30a temperature control surface
31 pipe
32 compressor
33 capacitor
34 evaporator
40 heat exchanger
40a temperature control surface
41 refrigerant pipe
42 compressor
43 capacitor
44 evaporator
R1, R2, R3 room

The invention claimed is:

1. A temperature control structure for a transport container, the temperature control structure comprising:
   a temperature control compartment provided in a transport machine;
   a transport container that is loaded into the temperature control compartment, and has a box shape capable of accommodating an object, in which at least a part of a wall constituting the box shape is a heat conduction portion made of metal; and
   a heat exchanger of a solid-state heat transfer type that is disposed in contact with the heat conduction portion and controls a temperature of the object via the heat conduction portion.

2. The temperature control structure for a transport container according to claim 1, wherein
   a plurality of the transport containers are loaded in contact with each other in the temperature control compartment, and
   at least a part of a portion where the transport containers are in contact with each other is the heat conduction portion.

3. The temperature control structure for a transport container according to claim 1, wherein the heat conduction portion is made of an aluminum alloy.

4. The temperature control structure for a transport container according to claim 1, further comprising a cold storage material or a heat storage material that controls a temperature of the transport container.

5. The temperature control structure for a transport container according to claim 1, wherein the transport container has a plurality of protruding portions having a heat insulating property on a first surface that is an outer surface.

6. The temperature control structure for a transport container according to claim 5, wherein the transport container has a plurality of recessed portions having shapes complementary to the protruding portions on a second surface that is an outer surface facing the first surface.

7. The temperature control structure for a transport container according to claim 1, wherein an inside of the temperature control compartment is partitioned into a plurality of rooms, and
the heat exchangers using refrigerants having different temperatures are arranged for the plurality of rooms, respectively.

8. The temperature control structure for a transport container according to claim 7, wherein the transport container has a plurality of protruding portions having a heat insulating property on a first surface that is an outer surface.

9. The temperature control structure for a transport container according to claim 8, wherein the transport container has a plurality of recessed portions having shapes complementary to the protruding portions on a second surface that is an outer surface facing the first surface.

10. The temperature control structure for a transport container according to claim 7, wherein
a plurality of the transport containers are loaded in contact with each other in the temperature control compartment, and
at least a part of a portion where the transport containers are in contact with each other is the heat conduction portion.

11. The temperature control structure for a transport container according to claim 7, wherein the heat conduction portion is made of an aluminum alloy.

12. The temperature control structure for a transport container according to claim 7, further comprising a cold storage material or a heat storage material that controls a temperature of the transport container.

13. The temperature control structure for a transport container according to claim 1, wherein
the temperature control compartment includes one room, and
a plurality of the heat exchangers using refrigerants having different temperatures are disposed in the one room.

14. The temperature control structure for a transport container according to claim 13, wherein the transport container has a plurality of protruding portions having a heat insulating property on a first surface that is an outer surface.

15. The temperature control structure for a transport container according to claim 14, wherein the transport container has a plurality of recessed portions having shapes complementary to the protruding portions on a second surface that is an outer surface facing the first surface.

16. The temperature control structure for a transport container according to claim 13, wherein
a plurality of the transport containers are loaded in contact with each other in the temperature control compartment, and
at least a part of a portion where the transport containers are in contact with each other is the heat conduction portion.

17. The temperature control structure for a transport container according to claim 13, wherein the heat conduction portion is made of an aluminum alloy.

18. The temperature control structure for a transport container according to claim 13, further comprising a cold storage material or a heat storage material that controls a temperature of the transport container.

19. A temperature control method for a transport container, the temperature control method comprising:
preparing a temperature control compartment provided in a transport machine, a transport container that is loaded into the temperature control compartment, and has a box shape capable of accommodating an object, in which at least a part of a wall constituting the box shape is a heat conduction portion made of metal, and a heat exchanger that controls a temperature of the object; and
bringing the heat exchanger and the heat conduction portion into contact with each other, and controlling the temperature of the object by the heat exchanger in a solid-state heat transfer manner via the heat conduction portion.

* * * * *